(12) United States Patent
Sun

(10) Patent No.: US 9,710,781 B2
(45) Date of Patent: Jul. 18, 2017

(54) DATA ACQUISITION APPARATUS AND SYSTEM

(71) Applicant: HON HAI PRECISION INDUSTRY CO., LTD., New Taipei (TW)

(72) Inventor: Zong-Yuan Sun, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1 day.

(21) Appl. No.: 14/794,330

(22) Filed: Jul. 8, 2015

(65) Prior Publication Data

US 2016/0224812 A1 Aug. 4, 2016

(30) Foreign Application Priority Data

Jan. 30, 2015 (CN) .......................... 2015 1 0047585

(51) Int. Cl.
| | |
|---|---|
| *H02J 1/12* | (2006.01) |
| *H02J 7/14* | (2006.01) |
| *G06Q 10/08* | (2012.01) |
| *H04L 12/10* | (2006.01) |
| *G05B 19/042* | (2006.01) |

(52) U.S. Cl.
CPC ......... *G06Q 10/087* (2013.01); *G05B 19/042* (2013.01); *H04L 12/10* (2013.01); *G05B 2219/25232* (2013.01)

(58) Field of Classification Search
CPC ....... G06K 7/10366; G06K 2017/0045; G06Q 10/20; G06Q 30/00; H05K 7/1498; G01C 21/20; G01C 21/26; G01S 19/42; H04R 1/1041; H04R 1/1091; H04L 1/0009; H04L 1/0041; H04L 1/0045; H04L 1/08; H04L 25/03038; H04L 27/2647; H04L 12/10; G01R 31/3624; G01R 31/3648; G01R 31/3693; H02J 1/12; H02J 2009/068; H02J 3/38; H02J 7/0047; H02J 9/00; Y10T 307/511; Y10T 307/724; G05B 19/042; G05B 2219/25232

See application file for complete search history.

(56) References Cited

U.S. PATENT DOCUMENTS

| | | | |
|---|---|---|---|
| 6,194,870 B1 * | 2/2001 | Kim .................... | G01R 31/3624 320/134 |
| 2003/0090155 A1 * | 5/2003 | Sanada ..................... | H02J 1/12 307/45 |

* cited by examiner

*Primary Examiner* — Dionne H Pendleton
(74) *Attorney, Agent, or Firm* — Steven Reiss

(57) ABSTRACT

A data acquisition system includes a terminal device and a plurality of data acquisition apparatuses located at multiple layers and communicating with the terminal device. Each of the plurality of data acquisition apparatuses includes a control unit, a data obtaining unit, a data transmission unit, and a detection unit. The data obtaining unit is electronically coupled to the control unit and directed by the control unit to obtain data from articles. The data transmission unit is electronically coupled to the terminal device, and the plurality of data acquisition apparatuses are interconnected via the data transmission unit to send the data to the terminal device. The detection unit detects whether the plurality of data acquisition apparatuses cooperatively form a communication loop, and outputs an indication signal if the communication loop is formed among the plurality of data acquisition apparatuses.

16 Claims, 3 Drawing Sheets

DATA ACQUISITION APPARATUS AND SYSTEM

FIELD

The subject matter herein generally relates to a data acquisition apparatus, and particularly relates to a data acquisition apparatus and a data acquisition system employing radio frequency identification (RFID) readers.

BACKGROUND

Data acquisition has evolved in access control systems, transportation industries, and intelligent park management system through the use of radio frequency identification (RFID) readers. For example, when an article is stored in a warehouse, a fixed reader positioned on a door of the warehouse reads identification numbers of RFID tags attached to the articles.

BRIEF DESCRIPTION OF THE DRAWING

Implementations of the present technology will now be described, by way of example only, with reference to the attached figure.

DETAILED DESCRIPTION

Figure 1:
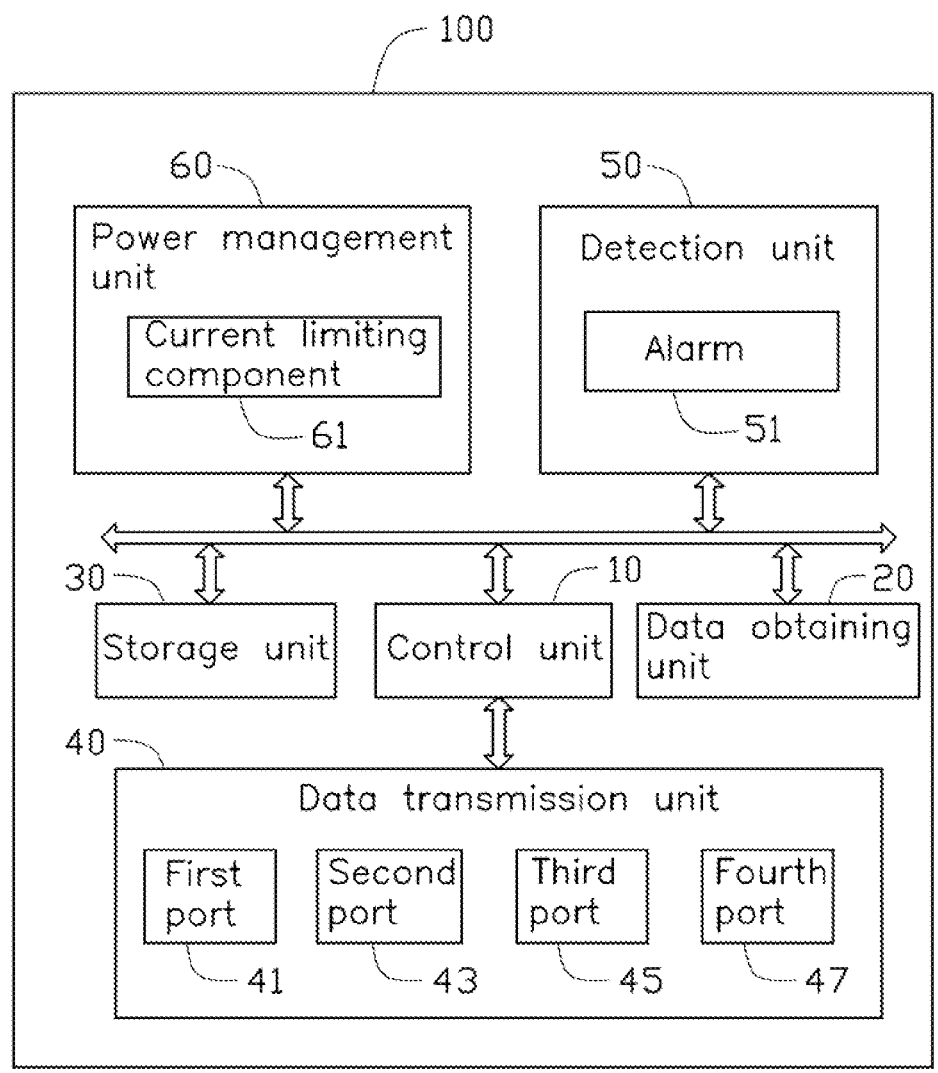
FIG. 1 is a block diagram of a data acquisition apparatus, according to an exemplary embodiment.

Numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawing is not necessarily to scale and the proportions of certain parts may be exaggerated to better illustrate details and features of the present disclosure.

A definition that applies throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a data acquisition system employing a data acquisition apparatus.

Figure 2:
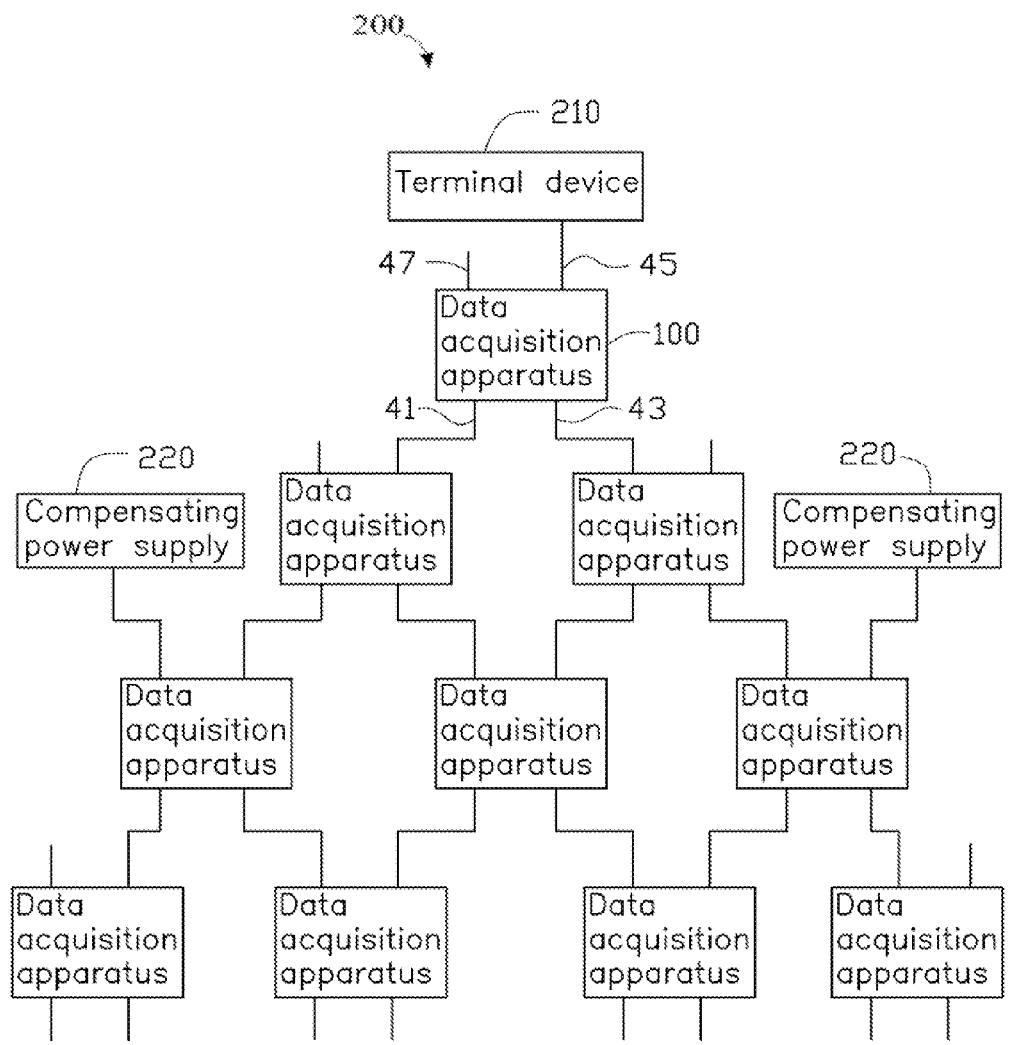
FIG. 2 is a first cascade structure graph of a data acquisition system employing the data acquisition apparatus of FIG. 1, according to a first exemplary embodiment.

FIG. 1 and FIG. 2 illustrate a first exemplary embodiment of a data acquisition system 200 employing a plurality of data acquisition apparatuses 100. The plurality of data acquisition apparatuses 100 are interconnected to obtain data from articles, such as clothes, computers, or confidential files, for example, and the data can be an identification number, for example. In at least one embodiment, the plurality of data acquisition apparatuses 100 are located at multiple layers, and consequently adopt a cascade structure. For example, one data acquisition apparatus 100 is located at a first layer, two data acquisition apparatuses 100 are located at a second layer, three data acquisition apparatuses 100 are located at a third layer, and four data acquisition apparatuses 100 are located at a fourth layer.

The data acquisition system 200 further includes a terminal device 210 (such as a personal computer or a server) and a plurality of compensating power supplies 220. Each of the plurality of data acquisition apparatuses 100 includes a control unit 10, a data obtaining unit 20, a storage unit 30, a data transmission unit 40, a detection unit 50, and a power management unit 60.

The control unit 10 is electronically coupled to the data obtaining unit 20, the storage unit 30, the data transmission unit 40, the detection unit 50, and the power management unit 60. Thus, the data obtaining unit 20, the storage unit 30, the data transmission unit 40, the detection unit 50, and the power management unit 60 can interconnected via the control unit 10.

The data obtaining unit 20 is directed by the control unit 10, and is configured to obtain data of the articles located in a predetermined reading/writing radius. In at least one embodiment, the data obtaining unit 20 is an active radio frequency identification (RFID) reader and operates at about 2.4 GHz. The data obtaining unit 20 reads the data of the articles and sends the data to the storage unit 30 via the control unit 10. It should be understood that, the predetermined reading/writing radius can be fine tuned via changing a transmitting power of the data obtaining unit 20.

The storage unit 30 pre-stores a media access control (MAC) address and an internet protocol (IP) address of the data acquisition apparatus 100. In at least one embodiment, the data acquisition apparatus 100 has a unique MAC address. When the data acquisition apparatus 100 communicates with the terminal device 210 via Ethernet, the terminal device 210 allocates a unique IP address to the data acquisition apparatus 100 based on the unique MAC address. In at least one embodiment, the storage device 30 can include various types of non-transitory computer-readable storage mediums. For example, the storage device 30 can be an internal storage system, such as a flash memory, a random access memory (RAM) for temporary storage of information, and/or a read-only memory (ROM) for permanent storage of information. The storage device 30 can also be an external storage system, such as a hard disk, a storage card, or a data storage medium.

The data transmission unit 40 includes at least two input ports and at least one output port. When the plurality of data acquisition apparatuses 100 adopt a cascade structure, the least two input ports are electronically coupled to an output port of the data acquisition apparatus 100 located at a lower layer, and the at least one output port is electronically coupled to an input port of the data acquisition apparatus 100 located at an upper layer or the terminal device 210. Thus, the plurality of data acquisition apparatuses 100 located at the multiple layers can send the data to the terminal device 210. In at least one embodiment, the data transmission unit 40 includes a first port 41, a second port 43, a third port 45, and a fourth port 47. All of the first port 41, the second port 43, the third port 45, and the fourth port 47 are power over ethernet (POE) ports, and thus can support two-way communication and can also provide power to the data acquisition apparatus 100 located at an adjacent layer (such as a lower layer or an upper layer). For example , the POE port can output direct current (DC) of about 12V, 24V, 36V, or 48V to the data acquisition apparatus 100 located at lower layer. In at least one embodiment, the first port 41 and the second port 43 serve as the input port of the data acquisition apparatus 100, and the third port 45 and the fourth port 47 serve as the output port of the data acquisition apparatus 100. In other embodiments, the first port 41, the second port 43, and the third port 45 can serve as the input port, and the fourth port 47 can serve as the output port. In at least one embodiment, the data transmission unit 40 is an Ethernet switch.

The detection unit 50 is configured to detect whether the plurality of data acquisition apparatuses 100 form a communication loop. The communication loop may represent that the plurality of data acquisition apparatuses 100 are electronically coupled end-to-end, that is, at least one output port of the plurality of data acquisition apparatuses 100 located at a lower layer is electronically coupled to at least one input port of the plurality of data acquisition apparatuses 100 located at an upper layer and current may be generated between the coupled data acquisition apparatuses 100. Thus, the plurality of data acquisition apparatuses 100 cannot output data via the output port due to the communication loop. When the plurality of data acquisition apparatuses 100 adopt a cascade structure, if a communication loop is formed among the plurality of data acquisition apparatuses 100, the detection unit 50 outputs an indication signal accordingly. Optionally, the detection unit 50 includes an alarm 51, such as a light-emitting diode (LED) or a buzzer, for outputting the indication signal. In at least one embodiment, the detection unit 50 is a current detection circuit which can detect the communication loop by the current.

The power management unit 60 is configured to convert an output voltage from the POE port into a working voltage for powering the control unit 10, the data obtaining unit 20, the storage unit 30, the data transmission unit 40, and the detection unit 50. In at least one embodiment, the power management unit 60 is a direct current to direct current (DC-DC) converter and includes a current limiting component 61. The current limiting component 61 can be a diode electronically coupled between two data acquisition apparatuses 100 located at two adjacent layers for protecting the plurality of data acquisition apparatuses 100 from damage.

Referring to FIG. 2, the plurality of data acquisition apparatuses 100 located at two adjacent layers adopt a cascade structure via a twisted-pair, and the plurality of data acquisition apparatus 100 located at a same layer are independent from each other. In detail, the third port 45 of the data acquisition apparatus 100 located at the first layer is electronically coupled to the terminal device 210 to send the data obtaining by the data obtaining unit 20 to the terminal device 210. In addition, the third port 45 can also receive controlling commands and power from the terminal device 210. The first port 41 and the second port 43 of the data acquisition apparatus 100 located at the first layer is electronically coupled to the output port of the data acquisition apparatus 100 located at the second layer to receive the data from the data acquisition apparatus 100 located at the second layer and send the controlling commands and the power to the data acquisition apparatus 100 located at the second layer. Additionally, the compensating power supply 220 may be coupled to the data acquisition apparatus 100 located at the second layer to compensate the power from the terminal device 210. In at least one embodiment, the compensating power supply 220 can be an alternating current to direct current (AC-DC) adapter which is used to output direct current associating with the POE port.

In use, the detection unit 50 detects whether the plurality of data acquisition apparatuses 100 form a communication loop. If a communication loop is formed among the plurality of data acquisition apparatuses 100, the alarm 51 outputs the indication signal to notify users to protect the data acquisition system 200 from entering an endless loop.

The terminal device 210 sends the controlling commands to the plurality of data acquisition apparatuses 100, and then the control unit 10 activates the data obtaining unit 20 in response to receiving the controlling commands. Finally, the plurality of data acquisition apparatuses 100 obtain the data from the articles and feed back the data to the terminal device 210 via the data acquisition apparatus 100 located at the first layer.

Figure 3:
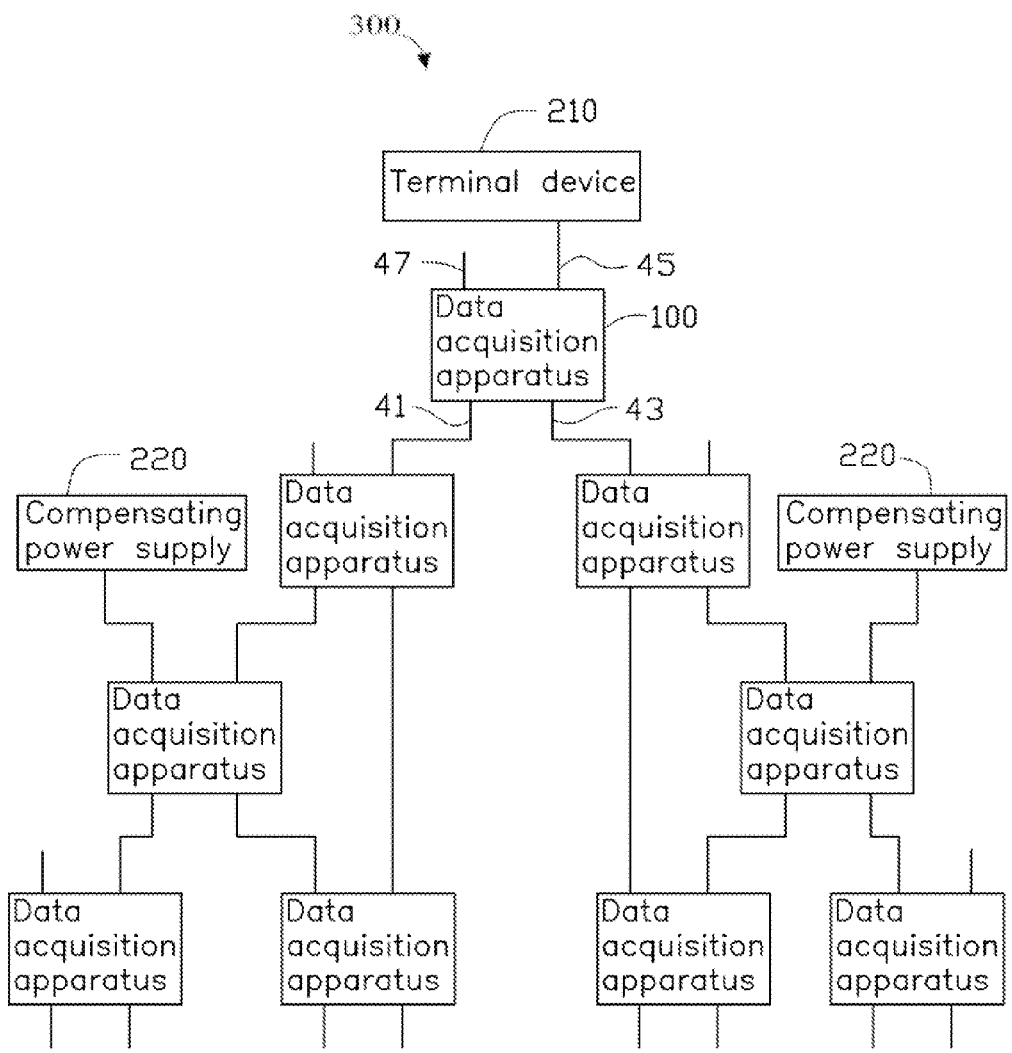
FIG. 3 is a second cascade structure graph of a data acquisition system employing the data acquisition apparatus of FIG. 1, according to a second exemplary embodiment.

FIG. 3 illustrates a second exemplary embodiment of a data acquisition system 300 employing a plurality of data acquisition apparatuses 100. Functions of the data acquisition system 300 is substantially same to the data acquisition system 200. A difference between the acquisition system 300 and the data acquisition system 200 is that, in the data acquisition system 300, the data acquisition apparatus 100 located at a lower layer can be electronically coupled to the data acquisition apparatus 100 located at any upper layer, but not limit to the adjacent layer. For example, a data acquisition apparatus 100 located at a fourth layer can be directly coupled to a data acquisition apparatus 100 located at a second layer. At this time, the data acquisition apparatus 100 calculates an optimum path between the terminal device 210 and itself according to the MAC addresses of plurality of data acquisition apparatuses 100 and the terminal device 210. Thus, the data acquisition apparatus 100 can feed back the data to the terminal device 210 via the optimum path to save time.

In summary, the plurality of data acquisition apparatuses 100 adopt a cascade structure to broaden the reading/writing radius. In addition, the data transmission unit 40 is incorporated into the data acquisition apparatus 100 to facilitate transmission of data and power, that may address problems such as packet loss during communications on the Ethernet. Thus, the data acquisition system 100 is both efficient and convenient.

The embodiments shown and described above are only examples. Many details are often found in the art such as the other features of the data acquisition system employing the data acquisition apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A data acquisition apparatus communicating with a terminal device or/and at least one other data acquisition apparatus, the data acquisition apparatus comprising:
   a control unit;
   a data obtaining unit electronically coupled to the control unit and directed by the control unit to obtain data from articles;
   a data transmission unit configured to be electronically coupled to the terminal device or/and the at least one other data acquisition apparatus for allowing the data acquisition apparatus to send the data to the terminal device or/and the at least one external data acquisition apparatus; and a detection unit configured to detect whether the data acquisition apparatus and the at least one other data acquisition apparatus cooperatively form a communication loop, and output an indication signal if the communication loop is formed among the data acquisition apparatus and the at least one external data acquisition apparatus.

2. The data acquisition apparatus as claimed in claim 1, wherein the data transmission unit comprises at least two input ports and at least one output port, the at least two input ports are electronically coupled to an output port of the at least one external data acquisition apparatus, the at least one output port is electronically coupled to an input port of the at least one external data acquisition apparatus or the terminal device.

3. The data acquisition apparatus as claimed in claim 2, wherein the data transmission unit comprises a first port, a second port, a third port, and a fourth port, the first port and the third port serve as the input port of the data acquisition apparatus, and the third port and the fourth port serve as the output port of the data acquisition apparatus, all of the first port, the second port, the third port, and the fourth port are power over ethernet (POE) ports, and provide power to the at least one external data acquisition apparatus.

4. The data acquisition apparatus as claimed in claim 3, further comprising a power management unit, wherein the power management unit converts an output voltage from the POE port into a working voltage for powering the control unit, the data obtaining unit, the data transmission unit, and the detection unit.

5. The data acquisition apparatus as claimed in claim 4, wherein the power management unit comprises a current limiting component electronically coupled between the data acquisition apparatuses and the at least one external data acquisition apparatus.

6. The data acquisition apparatus as claimed in claim 1, wherein the detection unit comprises an alarm, the alarm outputs the indication signal.

7. The data acquisition apparatus as claimed in claim 1, further comprising a storage unit, wherein the storage unit pre-stores a media access control (MAC) address and an internet protocol (IP) address of the data acquisition apparatus.

8. A data acquisition system comprising:
a terminal device; and
a plurality of data acquisition apparatuses located at multiple layers and communicating with the terminal device, each of the plurality of data acquisition apparatuses comprising:
a control unit;
a data obtaining unit electronically coupled to the control unit and directed by the control unit to obtain data from articles;
a data transmission unit configured to be electronically coupled to the terminal device, and the plurality of data acquisition apparatuses interconnected via the data transmission unit to send the data to the terminal device; and
a detection unit configured to detect whether the plurality of data acquisition apparatuses cooperatively form a communication loop, and output an indication signal if the communication loop is formed among the plurality of data acquisition apparatuses.

9. The data acquisition system as claimed in claim 8, wherein the data transmission unit comprises at least two input ports and at least one output port, the at least two input ports are electronically coupled to an output port of the plurality of data acquisition apparatuses located at a lower layer, and the at least one output port is electronically coupled to an input port of the plurality of data acquisition apparatuses located at an upper layer or the terminal device.

10. The data acquisition system as claimed in claim 9, wherein the data transmission unit comprises a first port, a second port, a third port, and a fourth port, the first port and the third port serve as the input port of the data acquisition apparatus, and the third port and the fourth port serve as the output port of the data acquisition apparatus, all of the first port, the second port, the third port, and the fourth port are power over ethernet (POE) ports, and provide power to the plurality of data acquisition apparatuses.

11. The data acquisition system as claimed in claim 10, wherein the data acquisition further comprises a power management unit, the power management unit converts an output voltage from the POE port into a working voltage for powering the control unit, the data obtaining unit, the data transmission unit, and the detection unit.

12. The data acquisition system as claimed in claim 11, wherein the power management unit comprises a current limiting component electronically coupled between two data acquisition apparatuses located at two adjacent layers.

13. The data acquisition system as claimed in claim 10, further comprising a plurality of compensating power supplies, the plurality of compensating power supplies are coupled to the POE port to compensate the power from the terminal device.

14. The data acquisition system as claimed in claim 8, wherein the detection unit comprises an alarm, the alarm outputs the indication signal.

15. The data acquisition system as claimed in claim 8, wherein the data acquisition further comprises a storage unit, the storage unit pre-stores a media access control (MAC) address and an internet protocol (IP) address of the data acquisition apparatus.

16. A data acquisition system comprising:
a terminal device; and
a plurality of data acquisition apparatuses located at multiple layers and communicating with the terminal device, each of the plurality of data acquisition apparatuses comprising:
a control unit;
a data obtaining unit electronically coupled to the control unit and directed by the control unit to obtain data from articles;
a data transmission unit; and
a detection unit configured to detect whether the plurality of data acquisition apparatuses cooperatively form a communication loop, and output an indication signal if the communication loop is formed among the plurality of data acquisition apparatuses;
wherein a most downstream layer of data acquisition apparatuses lacks a direct communication pathway to the terminal device, and communicates with the terminal device through at least one data acquisition apparatus within an intermediate layer.

* * * * *